Jan. 16, 1934.  H. T. THOMAS  1,943,495
COMBUSTION CHAMBER FOR DIESEL ENGINES
Filed June 4, 1931
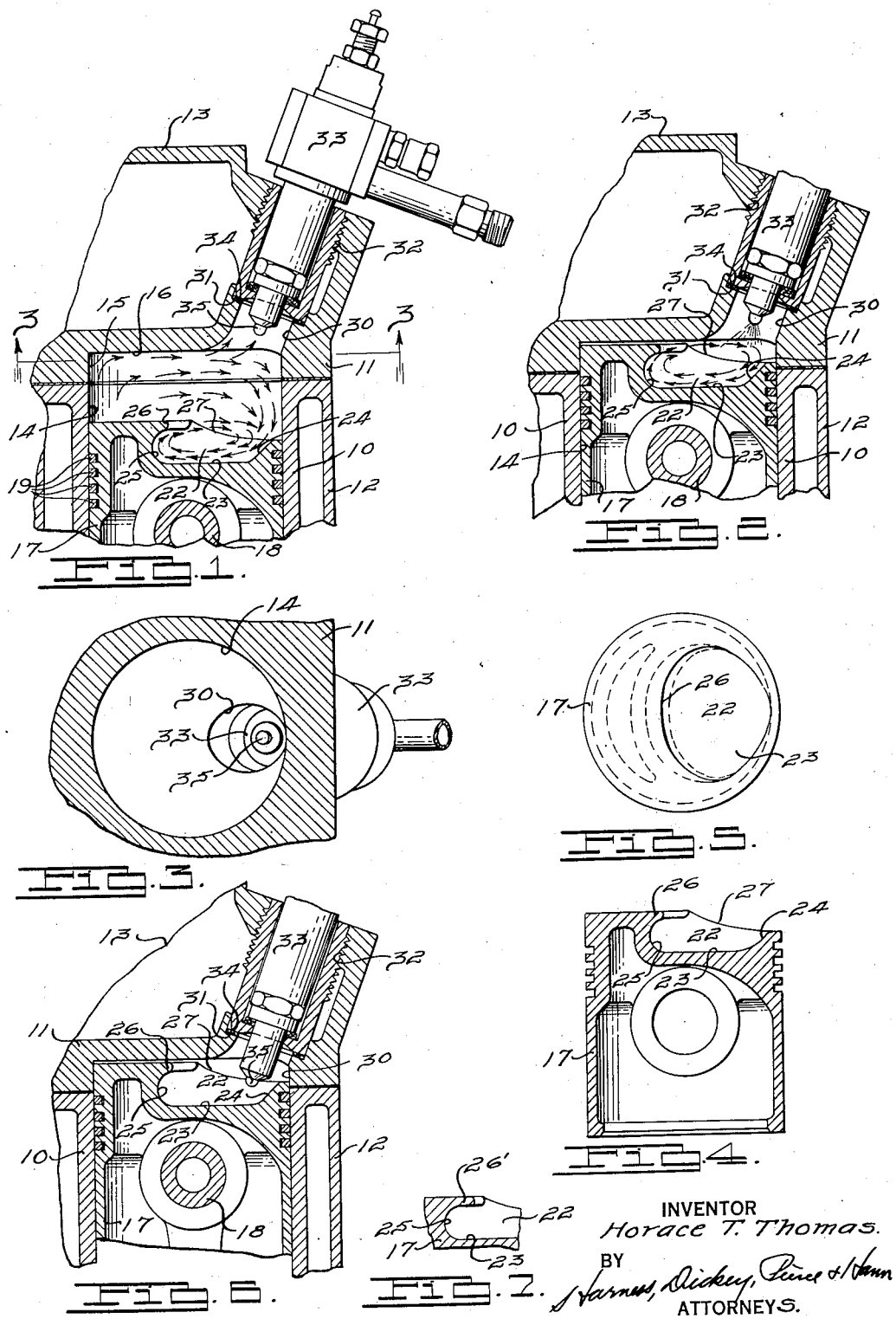
INVENTOR
Horace T. Thomas.
BY
ATTORNEYS.

Patented Jan. 16, 1934

1,943,495

UNITED STATES PATENT OFFICE 1,943,495

COMBUSTION CHAMBER FOR DIESEL ENGINES

Horace T. Thomas, Lansing, Mich., assignor to Reo Motor Car Company, Lansing, Mich., a corporation of Michigan Application June 4, 1931. Serial No. 542,012

5 Claims. (Cl. 123—32)

This invention relates to combustion chambers for internal combustion engines and while in its broader aspects it may be applicable to internal combustion engines other than the Diesel type, it is particularly adaptable for use in connection with engines of the Diesel type, and particularly those of the direct combustion type as differentiated from those of the pre-combustion type.

Objects of the present invention are to provide a combustion chamber for internal combustion engines of a novel form whereby to effect an improvement in the operation of such engines; to provide a combustion chamber of novel conformation whereby to improve the intimate inter-mixture of the air and fuel particles introduced into the combustion chamber; to provide a combustion chamber of novel form for an internal combustion engine and which combustion chamber is formed in part within the head of the associated piston in such a manner as to increase the amount of turbulence to which the explosive mixture is subjected to therein; to provide a combustion chamber for Diesel types of internal combustion engines so shaped and so related with respect to an associated fuel discharge nozzle as to maintain the particles of fuel discharged from the nozzle in suspension, and prevent them from being deposited upon the walls of the combustion chamber and pooling; to provide a combustion chamber for internal combustion engines formed at least in part in the head of the associated piston as a pocket eccentrically disposed with respect to the piston, and including a lipped surface so shaped that the combustible mixture flowing against the same will be turned back upon itself so as to increase the turbulence of such mixture; to provide such piston pocket on the side thereof opposite said lipped wall with an inclined edge so associated with a cooperating fuel nozzle that the air and any residual products of combustion being compressed in the combustion chamber will sweep the particles of oil from the fuel nozzle along therewith and maintain them out of contact with the walls of the combustion chamber; and to provide a combustion chamber of the type described with a specific location and arrangement of the fuel nozzle with respect thereto whereby to enable optimum operating conditions to be realized in connection therewith;

The above being among the objects of the present invention, the same consists in certain features of construction and combinations of parts to be hereinafter described with reference to the accompanying drawing, and then claimed, having the above and other objects in view.

In the accompanying drawing, which illustrates a suitable embodiment of the present invention, and in which like numerals refer to like parts throughout the several different views, Fig. 1 is a diagrammatic, partially broken sectional view taken axially through the upper part of an internal combustion engine of the Diesel type incorporating an embodiment of the present invention, the cooperating piston being shown on its up stroke and before it has reached the top of such stroke.

Fig. 2 is a view similar to Fig. 1 but illustrating the piston in its uppermost position.

Fig. 3 is a sectional view taken on the line 3—3 of Fig. 1.

Fig. 4 is a sectional view taken axially through the piston shown in Figs. 1 and 2 and in the same plane as in Figs. 1 and 2.

Fig. 5 is a plan view of the head of the piston shown in Fig. 4.

Fig. 6 is a view similar to Fig. 2 but illustrating a modification in the location of the discharge end of the fuel nozzle.

Fig. 7 is a fragmentary sectional view illustrating a modification of the lip for the pocket formed in the piston in the previous views.

As previously stated, although the present invention may be applicable to internal combustion engines other than the Diesel type, it will be understood that it has been designed particularly for use in connection with Diesel engines of the direct injection type, and consequently in the following description reference will be had mainly to its application to such Diesel engines. Those skilled in the art of gasoline internal combustion engines will recognize the desirable attributes and the obvious application of the present invention to such engines.

The main distinction between a Diesel and a gasoline engine is the manner of bringing about the required homogeneous mixture of fuel and air. In either engine such a mixture is essential to complete combustion, which process takes place in an extremely short time, amounting to about .004 seconds at an engine speed of 1800 R. P. M. It will be understood that in the gasoline engine this mixing of fuel and air is accomplished in the carburetor, intake manifold, rotary distributor if used, and finally in the cylinder itself during the intake and compression strokes. In the Diesel engine of the direct injection type no fuel is admitted into the cylinder until practically the instant that combustion is desired, so that it is obvious that in a high speed Diesel engine special means must be provided to insure complete and efficient combustion.

It is commonly accepted that in order to obtain the necessary homogeneous mixture of air and fuel for high speed Diesel engines of the direct injection type the combustion chamber must be so designed as to promote the turbulence of the combustible mixture therein. A great many different types of designs have been suggested for effecting such turbulence, some of which include special shapes of that portion of the combustion chamber included in the cylinder head, and in others by special shape of that part of the combustion chamber included in the piston, and in some designs special shapes in both. The present invention is included in the second of these types. Some of these previously suggested constructions have been designed with the particular end in view of obtaining the desired turbulence of the combustible mixture by imparting thereto a rapid whirling motion in the cylinder and combustion chamber, and the present invention deals particularly with this type of construction.

I have found that what may appear on their face to be only minor changes in the form of combustion chamber shapes for Diesel engines, oftentimes are, in reality, sufficient to control the commercial success or failure of the construction. This may be particularly true in connection with the form of combustion chamber of the present invention which, in its main features, offhand may appear similar to some constructions heretofore proposed, but I have found that such previously suggested constructions when employed in the manner of the present invention are not at all satisfactory without the features here embodied.

It is essential in the design of any successful combustion chamber for Diesel engines that the design be such that very little if any of the injected fuel be allowed to become deposited on the walls of the combustion chamber, as in such case the fuel that becomes deposited upon the walls is cooled thereby and often pools, and thereafter its combustion is obtained only with great difficulty, the common result being a fouling of the cylinder and piston head with the attendant disadvantages.

In my experiments leading up to the present invention, I have found, particularly with the solid or direct injection type of Diesel engine, that the position of the fuel injection nozzle with respect to the various parts of the combustion chamber bears an extremely important relation with respect to the proper operation of the engine, and undoubtedly this is a result of the effect which the location of the fuel nozzle has upon the proportionally small amount of fuel discharged from the nozzle which becomes deposited upon the walls of the cylinder and the combustion chamber. Accordingly, with these points in view references will now be made to the drawing in order to more clearly disclose the features of the present invention.

The engine illustrated in the drawing is shown as being provided with a cylinder 10 closed at its upper end by a cylinder head 11. The cylinder 10 is shown as being provided with a water jacket 12 and the cylinder head 11 with a water jacket 13. The bore 14 of the cylinder 10 is shown as being extended up into the cylinder head 11 as at 15, although it will be understood that as far as this particular feature is concerned it is not essential to the practice of the present invention and the desirability of its use may be left to the desires or dictates of the particular designer. The end wall 16 of the bore of the cylinder, which forms one wall of the combustion chamber, may be perfectly flat as indicated.

Within the bore 14 of the cylinder 10 is axially slidably received the piston 17 which is adapted to be connected by a piston pin 18 and connecting rod (not shown) to a crank shaft (not shown) in a conventional manner. Packing may be supplied for the piston 17 in the form of piston rings 19 in accordance with conventional practice. The upper face of the piston 17 is provided therein with a pocket, indicated generally as at 22, mainly located at one side of the piston as clearly indicated in the drawing, and of generally ovoid shape when viewed from the head end of the piston. The bottom wall 23 of the pocket 22 may be substantially flat over its central area and merges at its right hand end, as viewed in the drawing, into the upwardly and outwardly inclined wall surface 24. The opposite or left hand side of the bottom wall 23 merges into the curved surface or wall 25 which in vertical section is approximately semi-circular and acts to provide an overhanging lip 26 in the head of the piston overlying this side of the pocket 22. As best illustrated in Fig. 5 the lip 26 extends around substantially the entire left hand side of the pocket 22 and gradually merges out at the ends of said half. The lower portion of the curved wall 25 extends completely around the pocket 22 and merges into and forms a part of the inclined wall 24. That portion of the upper wall of the piston 17 including the right hand half of the pocket 22, as viewed in Fig. 5, is downwardly and outwardly cut away from the center of the pocket, as indicated at 27, so as to somewhat impart to the pocket 22 the effect of opening in an upward and outwardly direction with respect to the axis of the piston. The amount which the piston is thus cut away may be varied to a greater or lesser extent as long as the characteristics of the wall 24 and lip 26 are retained.

It may be here noted that the relative size of the pocket 22 with respect to the area of the piston may vary more or less in different designs depending upon the size of the engine, the compression pressure desired, and other variable features under the control of the particular designer. It will be noted that in the present construction the design is such that the piston 17 is intended, when in its uppermost position, to closely approach the end surface 16 of the cylinder bore 14, and it will be understood that the upper face of the piston 17 outside of the limits of the pocket 22 is preferably perfectly flat so as to permit it to approach the end wall 16 as closely as practical during normal operation of the engine.

The cylinder head 11 is provided with a bore 30 offset with respect to the axis of the cylinder 10 in the same direction as the pocket 22 in the piston 17 and extending at an angle with respect to the axis of the cylinder 10 as indicated. Adjacent the lower end of the bore 30 the cylinder head 13 is formed to provide a shoulder 31 and the walls of the bore 30 adjacent the outer end thereof are threaded as at 32. A fuel injection nozzle of suitable construction, indicated in the drawing generally as at 33, extends downwardly into the bore 30 and is threadedly engaged with the thread 32. Its lower end is sealed against leakage with respect to the cylinder head 13 through the employment of a suitable gasket 34 interposed between such end and the shoulder 35.

31. The extreme discharge end 35 of the nozzle 33 is shown in Figs. 1 and 2 as being positioned above the general plane of the end wall 16 of the cylinder bore and, as will be apparent, is so positioned as to discharge the fuel therefrom into the pocket 22 adjacent the outer or right hand end thereof as viewed in the drawing.

In the operation of the engine as thus far described, let it be assumed that the piston 17 is substantially at the bottom of its stroke and just starting on the up stroke and a fresh charge of air has been introduced into the cylinder. The piston 17, in moving upwardly, tends to compress this fresh charge of air in the cylinder, in addition to such volume of residual gases or burned products of combustion that they have been retained in the cylinder from the previous explosion stroke. As the piston moves upwardly under such conditions and as it approaches, for instance, the relative position indicated in Fig. 1, it will be apparent that because of the fact that the left hand side of the piston, as viewed in the drawing, is relatively closer to the end of the cylinder than the right hand side of the piston head, or in other words is closer than the bottom wall 23 of the pocket 22, there will be a tendency for the bulk of the air and residual gases to be forced toward the right hand side of the cylinder and piston. Obviously the closer the piston 17 approaches the end 16 of the cylinder the more rapid will be the flow of the air and residual gases to the right hand side of the cylinder.

In flowing to the right hand side of the cylinder, as viewed in the drawing, these gases tend to flow across the under side of the surface 16, and while a small proportion thereof are trapped in the lower portion of the bore 30 in the cylinder head 13, the main portion thereof will be directed downwardly on the other side of the cylinder and in being directed downwardly will be guided by the inclined surface 24 inwardly along the bottom of the pocket 22 to the curved wall 25 where it will be directed upwardly and, because of the overhanging lip 26, will be turned back upon itself, thus causing that portion of the gases within the pocket 22 to be rapidly rotated therein. As the piston 72 continues to approach the end wall 16 the relative proportion of the gases in the cylinder confined within the pocket 22 will increase until eventually when the piston reaches the upper limit of the upper stroke, as indicated in Fig. 2, substantially all of said gases will be wholly confined within the pocket 22 and will be rapidly rotating therein as indicated by the arrows in Fig. 2.

It is at the moment the piston 17 reaches its upper dead center position as indicated in Fig. 2, or slightly before such time, that the fuel is injected from the nozzle 33 into the cylinder. It will be obvious, as indicated in Fig. 2 that such fuel is being injected into the cylinder, because of the relative relation of the fuel nozzle 33 with respect to the pocket 22, will strike the rapidly rotating body of gases in the pocket 22 in a direction transverse to the direction of flow thereof at the point where it is injected. Consequently, due to the high rotational speed of the body of gases in the pocket 22 at this instant, the respective increments of the volume of such body of gases will receive its proportional share of the fuel injected thereinto, and the continued rotation of this combustible mixture will act to more thoroughly intermix the gas and fuel particles to effect a complete homogeneous mixture. Moreover, due to the construction of the lip 26, the heat received thereby during the last explosion stroke will not have been dissipated as fast as that absorbed by the rest of the piston, and consequently it will be hot enough to materially aid in vaporizing any liquid fuel particles coming in contact therewith. As will be understood by those familiar with the art, at or about this time the compression of the combustible mixture within the combustion chamber formed between the pistons and the cylinder head produces a sufficient temperature to cause self ignition of this combustible mixture, and during burning of this mixture the rotational movement imparted to the same will be continued so as to insure complete combustion of the entire volume thereof.

In the operation of this device it is assumed, and I say assumed because of the obvious inability to determine the action taking place in such cylinder with exactness, that the fuel in being discharged into the rapidly rotating body of gaseous substance within the combustion chamber is discharged into and carried along mainly by the outer layer of such rotating body of gases and thereby effects a more complete and homogeneous mixture of such gases and fuel. One reason for holding such belief is that I have found that if the fuel nozzle 33 is projected down into the cylinder so as to be actually received within the pocket 22 when the piston is at its extreme upper position as indicated in Fig. 6, substantially the same favorable results are obtained as when the fuel nozzle 33 is positioned above the plane of the wall 16 as indicated in Figs. 1 and 2, while if the discharge end of the fuel nozzle 33 is positioned approximately intermediate the positions indicated in Figs. 2 and 6 the favorable result obtained when the fuel nozzle is in either of the positions indicated in Figs. 2 and 6 is lost to a great extent. Accordingly, it is assumed that when the nozzle 33 is positioned in such intermediate position the fuel discharge therefrom is discharged into the center of the rapidly rotating body of gases in the combustion chamber and the tendency is to hold the fuel in such central position instead of effecting the intimate mixture with the entire body of gas as desired. Accordingly, it will be apparent that the position of the discharge end of the nozzle 33 must be so located as to discharge its contents either into the upper layer of the rapidly rotating body of gas in the pocket 22 or into the lower layer of such body of gas and that in either case a satisfactory result will be obtained. However, even then I find that the axial position of the fuel nozzle must be controlled within relatively close limits.

Likewise it will be apparent that it is desirable to inject the fuel into such rapidly rotating body of gas in a direction perpendicular to its major axis instead of in a direction parallel or approximately parallel therewith for the reason that a greater area of the gas is available for forming the fuel particles and consequently there is less likelihood of the fuel particles being carried into contact with the walls of the combustion chamber with the consequent disadvantageous result of pooling of this fuel.

I have found that with the above described construction I am enabled to obtain satisfactory starting and operating conditions with an engine employing as much as 150 lbs. per square inch less compression pressure than that conventionally employed in such engines, and am enabled to increase the mean effective pressure of an engine of this type without producing a black exhaust smoke, over engines of this type and of the same size and speed equipped with combustion chamber shapes which have been previously disclosed and are apparently similar to my construction in that they include the cooperating flat surfaces on the pistons and the end of the cylinder, and the pocket in the piston, but do not include the inclined edges surrounding the bottom wall of the pocket, the overhanging lip on the one side of the pocket, and inject the fuel in a direction perpendicular to the axis of the cylinder rather than have an angle less than 60 degrees with respect to the axis of such cylinder. The fact that I am enabled to operate an engine equipped with the present invention at lower compression pressures, and to employ a higher mean effective pressure with my improved construction than in heretofore known constructions, without the occurrence of the black exhaust gases or detonations, is proof that the present construction involves considerable merit over such previously suggested constructions. Accordingly, it will be apparent that the changes here involved over constructions heretofore proposed, while appearing at first glance to be of a more or less minor nature, are in fact changes of a major nature when all things are considered.

It may be desirable to point out in relation to the lip 26 that the amount of overhang thereof relative to the pocket 22 may be varied to a greater or a lesser extent without seriously effecting the desirable results obtained by the construction described, as long as the overhang is sufficient to insure the return flow of the gases flowing upward along the wall 25. As a matter of interest I illustrate in Fig. 7 a fragmentary view of a portion of a piston in which the overhang 26' is extended considerably over that illustrating the previous figures and which amount of overhang apparently gives equally satisfactory, if not better results, than that illustrated in the previous figures.

These and other formal changes may be made in the specific embodiment of the invention described without departing from the spirit and substance of the broad invention, the scope of which is commensurate with the appended claims.

I claim:

1. In an internal combustion engine, of the compression ignition type in combination, a cylinder having a bore and an end wall, a piston slidable in said bore and having a closed end wall of substantially the same general contour as said end wall and adapted to closely approach said end wall at one end of its stroke, said piston having a relatively flat ovoid pocket formed in and substantially parallel to the plane of the head thereof eccentrically to the axis of said piston, that portion of the end wall of said pocket closest to said axis being reversely curved to form a lip overhanging the corresponding side of said pocket and providing a hot spot during engine operation, and that portion of said end wall of said pocket opposite the first mentioned portion being outwardly and upwardly curved.

2. In an internal combustion engine, of the compression ignition type, in combination, a cylinder having a bore and an end wall, a piston slidable in said bore and having a closed end wall of substantially the same general contour as said end wall and adapted to closely approach said end wall at one end of its stroke, said piston having a substantially flat pocket of avoid shape formed in the head thereof eccentrically to the axis of said piston, the bottom wall of said pocket merging at its edges into an upwardly inclined wall portion, and approximately that half only of said upwardly inclined wall portion nearest the axis of said piston being continued to form a reversely turned surface forming a lip overhanging the corresponding side of said pocket.

3. In an internal combustion engine, of the compression ignition type, in combination, a cylinder having a bore and an end wall, a piston slidable in said bore and having a closed end wall of substantially the same general contour as said end wall and adapted to closely approach said end wall at one end of its stroke, said piston having an O-shaped pocket formed in the head thereof eccentrically to the axis of said piston, that portion only of the end wall of said pocket closest to said axis being reversely curved to form a lip overhanging the corresponding side of said pocket, and that portion of said end wall of said pocket opposite the first mentioned portion being outwardly and upwardly curved and being of less height than said first mentioned portion.

4. In an internal combustion engine, in combination, a cylinder having a bore and an end wall, a piston slidable in said bore and having a closed end wall of substantially the same general contour as said end wall and adapted to closely approach said end wall at one end of its stroke, said piston having a generally flat pocket formed in and substantially parallel to the plane of the head thereof eccentrically to the axis of said piston, that portion of the end wall of said pocket closest to said axis being reversely curved to form a lip overhanging the corresponding side of said pocket, and that portion of said end wall of said pocket opposite the first mentioned portion being outwardly and upwardly curved, and a fuel nozzle positioned to discharge fuel into said pocket in a direction angularly disposed with respect to the plane of said pocket into proximity to said outwardly and upwardly curved wall when said piston is at the outer end of its stroke.

5. In an internal combustion engine, in combination, a cylinder having a bore and an end wall, a piston slidable in said bore and having a closed end wall of substantially the same general contour as said end wall and adapted to closely approach said end wall at one end of its stroke, said piston having a pocket formed in the head thereof eccentrically to the axis of said piston, said pocket being generally O-shaped when viewed axially of said piston and that portion of the end wall of said pocket closest to said axis being reversely curved to form a lip overhanging the corresponding side of said pocket, and that portion of said end wall of said pocket opposite the first mentioned portion being outwardly and upwardly curved, and a fuel nozzle positioned to discharge fuel into said pocket into proximity to said outwardly and upwardly curved wall when said piston is at the outer end of its stroke, and at an angle with respect to the axis of said piston less than the corresponding general angle of said outwardly and upwardly curved portion.

HORACE T. THOMAS.